(12) United States Patent
Mielczarek et al.

(10) Patent No.: US 12,351,036 B2
(45) Date of Patent: Jul. 8, 2025

(54) MAGNETIC LEVITATION RAILWAY SYSTEM

(71) Applicant: Hyper Poland Electro S.A., Warsaw (PL)

(72) Inventors: Lukasz Mielczarek, Lodz (PL); Pawel Radziszewski, Warsaw (PL); Katarzyna Foljanty, Berlin (DE); Przemyslaw Paczek, Warsaw (PL); Tomasz Kublin, Warsaw (PL)

(73) Assignee: Hyper Poland Electro S.A., Warsaw (PL)

( * ) Notice: Subject to any disclaimer, the term of this patent is extended or adjusted under 35 U.S.C. 154(b) by 962 days.

(21) Appl. No.: 17/269,493

(22) PCT Filed: Aug. 20, 2019

(86) PCT No.: PCT/EP2019/072304
§ 371 (c)(1),
(2) Date: Feb. 18, 2021

(87) PCT Pub. No.: WO2020/038964
PCT Pub. Date: Feb. 27, 2020

(65) Prior Publication Data
US 2021/0316616 A1 Oct. 14, 2021

(30) Foreign Application Priority Data

Aug. 20, 2018 (PL) .......................................... 426732
Aug. 20, 2018 (PL) .......................................... 426733

(51) Int. Cl.
*B60L 13/04* (2006.01)
*B60L 13/10* (2006.01)
(Continued)

(52) U.S. Cl.
CPC ............... *B60L 13/04* (2013.01); *B60L 13/10* (2013.01); *E01B 2/00* (2013.01); *E01B 25/30* (2013.01)

(58) Field of Classification Search
CPC .......... B60L 13/00; B60L 13/04; B60L 13/08; B60L 13/10; E01B 1/00; E01B 1/001;
(Continued)

(56) References Cited

U.S. PATENT DOCUMENTS 3,869,990 A * 3/1975 Bertling ................ B60L 13/003
104/130.02
3,896,737 A * 7/1975 Miericke ................ B61B 13/08
104/130.02

(Continued)

FOREIGN PATENT DOCUMENTS

CN 1827441 9/2006
CN 101063287 10/2007
(Continued)

OTHER PUBLICATIONS

International Search Report and Written Opinion issued by the International Searching Authority, dated Dec. 3, 2019, for International Patent Application No. PCT/EP2019/072304; 16 pages.

*Primary Examiner* — Zachary L Kuhfuss
*Assistant Examiner* — Heaven R Buffington
(74) *Attorney, Agent, or Firm* — Faegre Drinker Biddle & Reath LLP

(57) ABSTRACT

Magnetic levitation railway system for integration in a wheel railway track, comprising a magnetic levitation railway track including a linear motor and magnetic levitation rails arranged on outer sides of the wheel railway track, said magnetic levitation rail comprising a conductive guide rail having at least a horizontal portion configured for a magnetic levitation railway vehicle having a levitation device with magnets. The guide rail is configured for passive
(Continued)

levitation of the magnetic levitation railway vehicle due to the electromotive force generated by the moving magnets of the magnetic levitation railway vehicle.

18 Claims, 13 Drawing Sheets

(51) Int. Cl.
*E01B 2/00* (2006.01)
*E01B 25/30* (2006.01)
(58) Field of Classification Search
CPC . E01B 1/002; E01B 1/004; E01B 2/00; E01B 5/00; E01B 25/30; E01B 25/305; E01B 2205/00; E01B 2204/06
USPC .......................................................... 104/282
See application file for complete search history.

(56) References Cited

U.S. PATENT DOCUMENTS

| | | | | |
|---|---|---|---|---|
| 4,905,896 A | * | 3/1990 | Eisenmann | ............. E01B 1/004 404/31 |
| 4,972,779 A | | 11/1990 | Morishita | |
| 5,156,092 A | | 10/1992 | Hirtz | |
| 5,953,996 A | * | 9/1999 | Powell | ................... B60L 13/04 104/292 |
| 10,208,431 B1 | * | 2/2019 | Van Rosendale | ....... E01B 25/30 |

FOREIGN PATENT DOCUMENTS

| | | | | |
|---|---|---|---|---|
| CN | 201087316 | | 7/2008 | |
| CN | 101481893 | | 7/2009 | |
| CN | 101935966 | | 1/2011 | |
| EP | 1355008 | | 10/2003 | |
| EP | 1355008 A1 | * | 10/2003 | ............ E01B 26/00 |
| JP | S4958508 | | 6/1974 | |
| JP | H0490958 | | 3/1992 | |
| JP | H09268507 | | 10/1997 | |
| JP | 3074439 | | 10/2000 | |
| JP | 2002-118018 | | 4/2002 | |
| JP | 2002227101 A | * | 8/2002 | ............... E01B 1/00 |
| JP | 2014-530973 | | 11/2014 | |
| KR | 20100025939 A | * | 3/2010 | ............ E01B 25/32 |
| WO | 99/51454 | | 10/1999 | |
| WO | 01/11143 | | 2/2001 | |
| WO | 2013/060344 | | 5/2013 | |
| WO | 2013/135851 | | 9/2013 | |
| WO | WO-2018185124 A1 | * | 10/2018 | .............. B60L 13/04 |

* cited by examiner

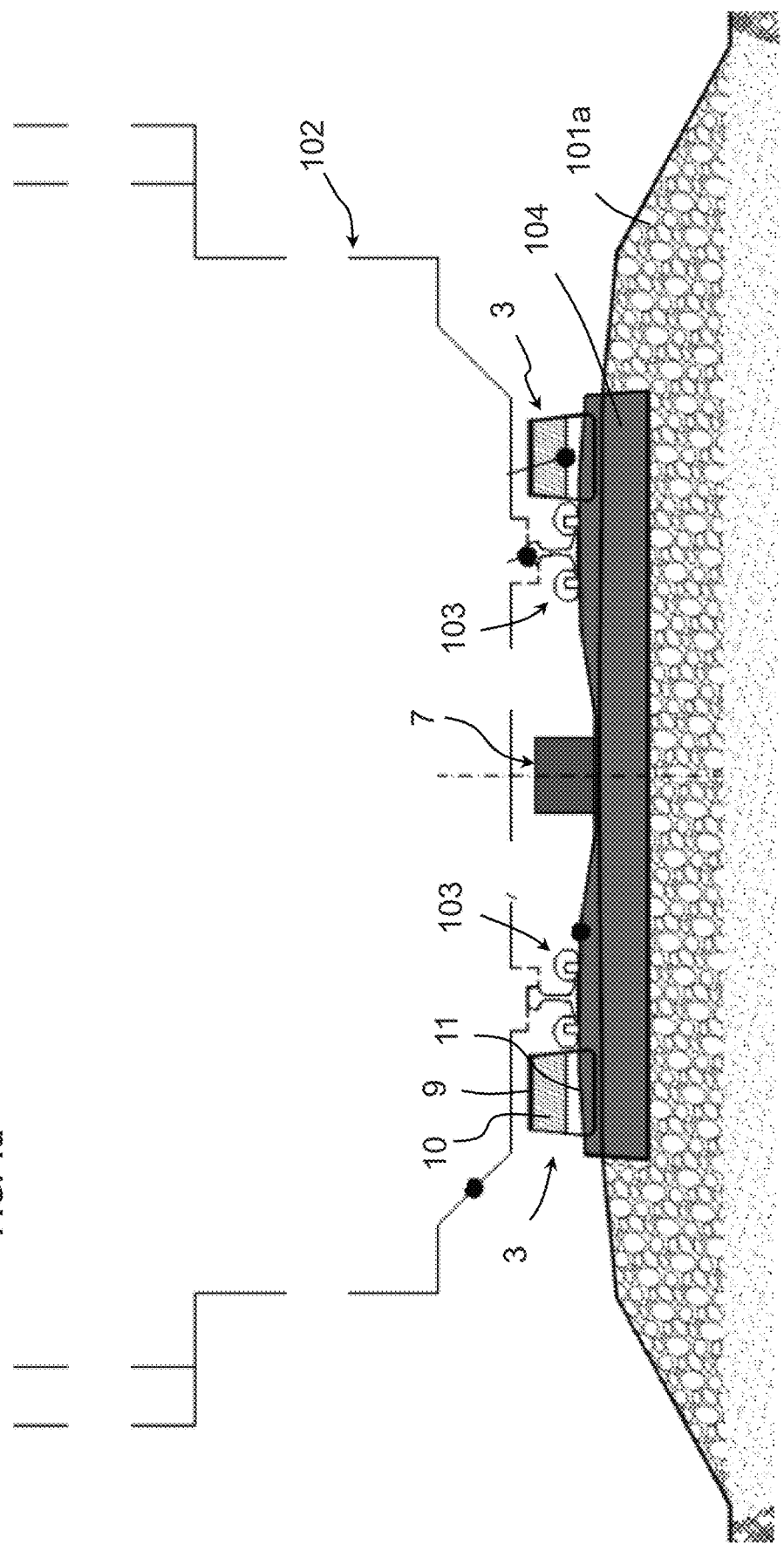

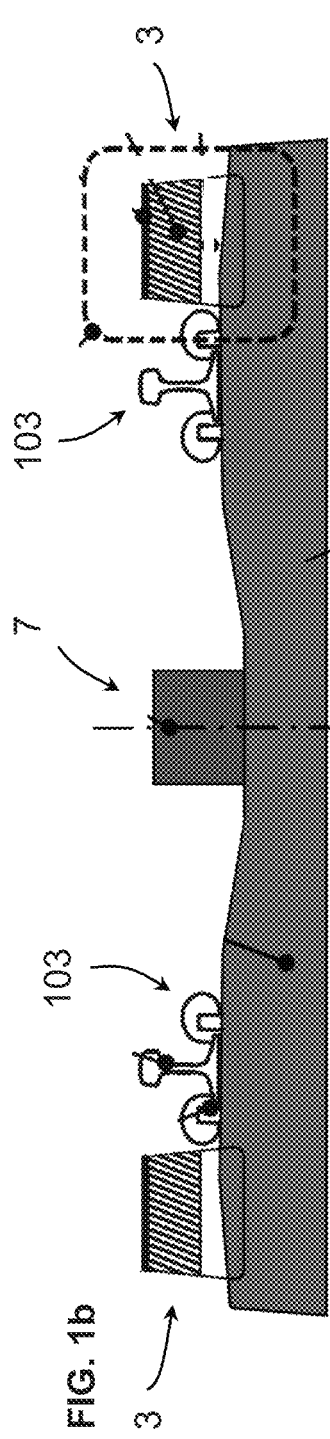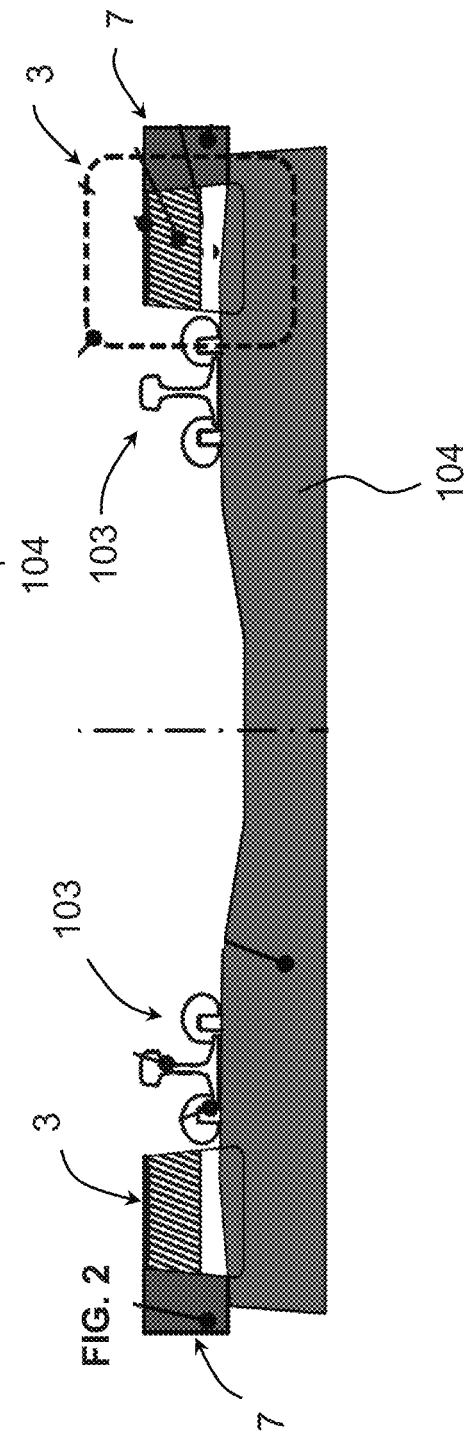

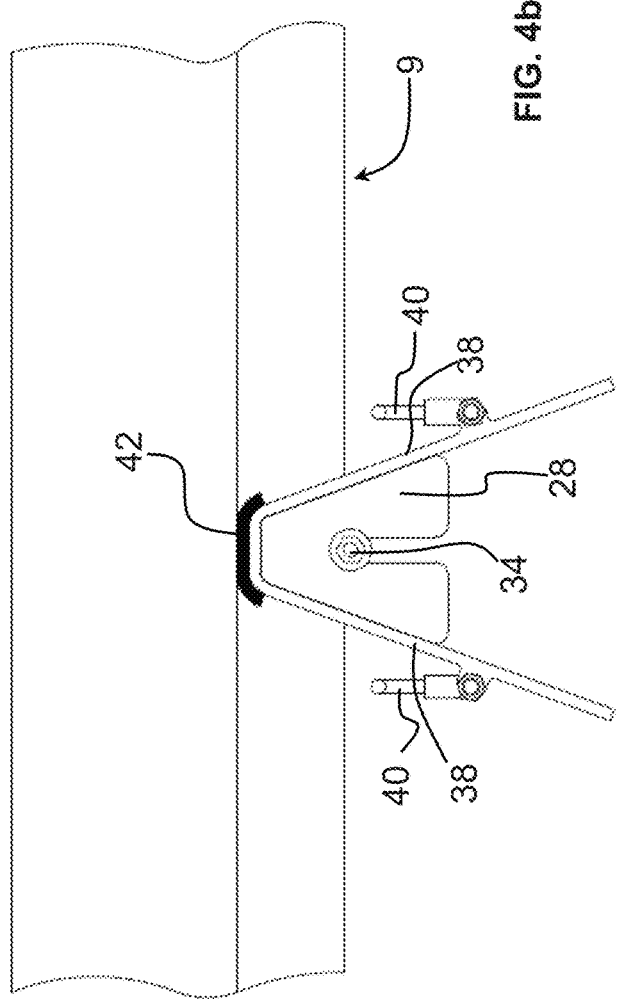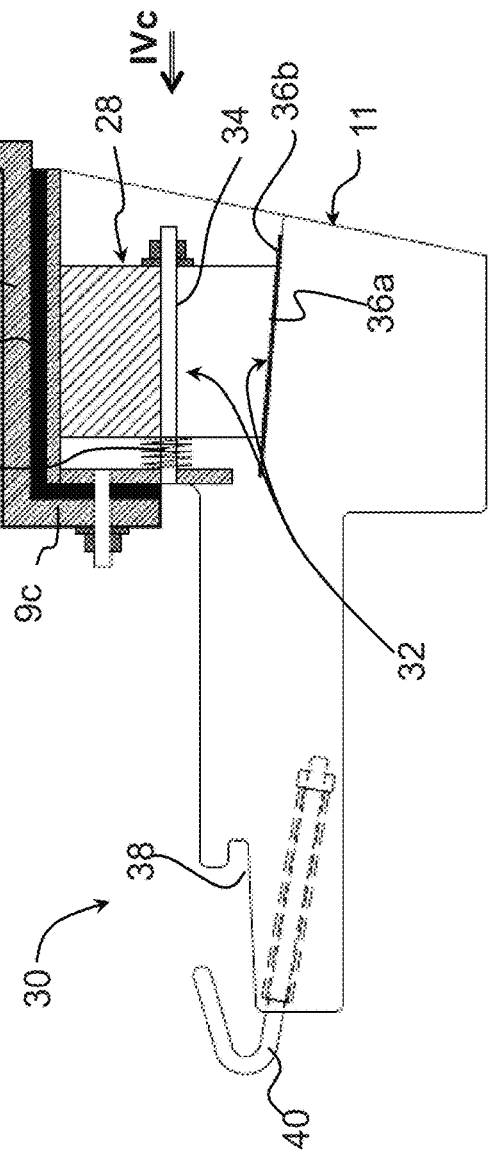

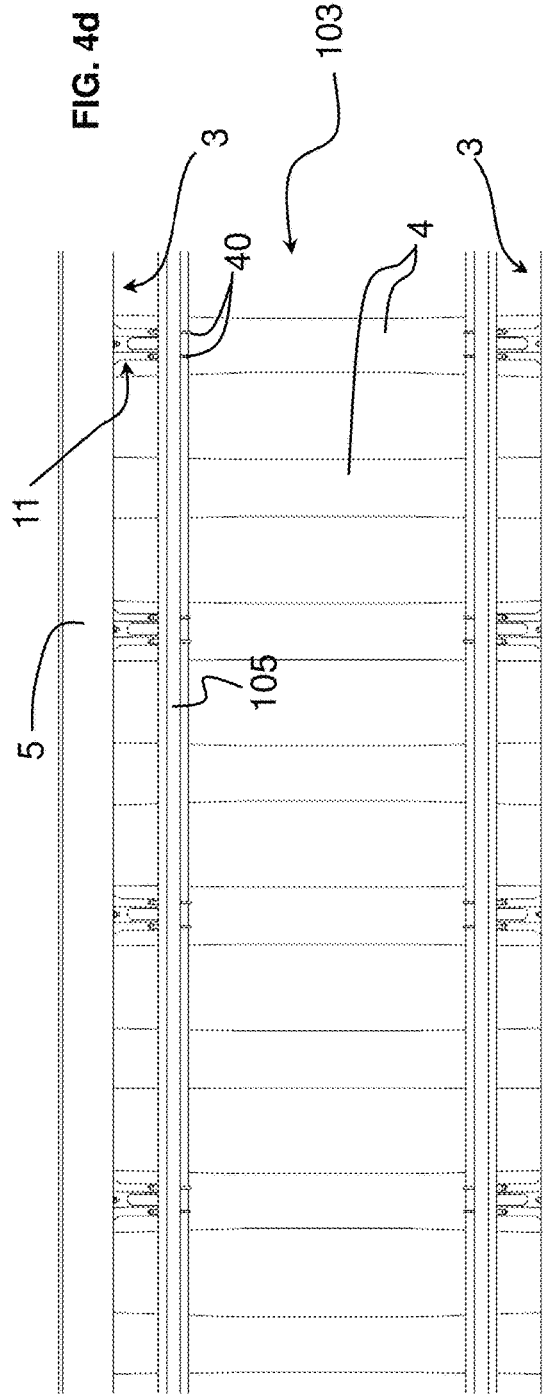
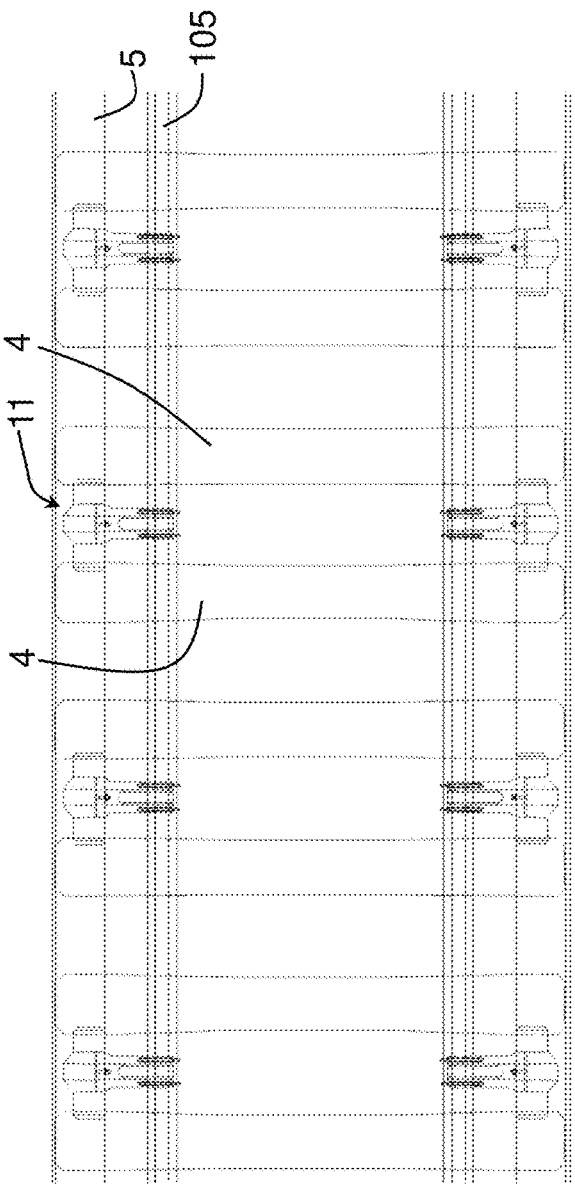

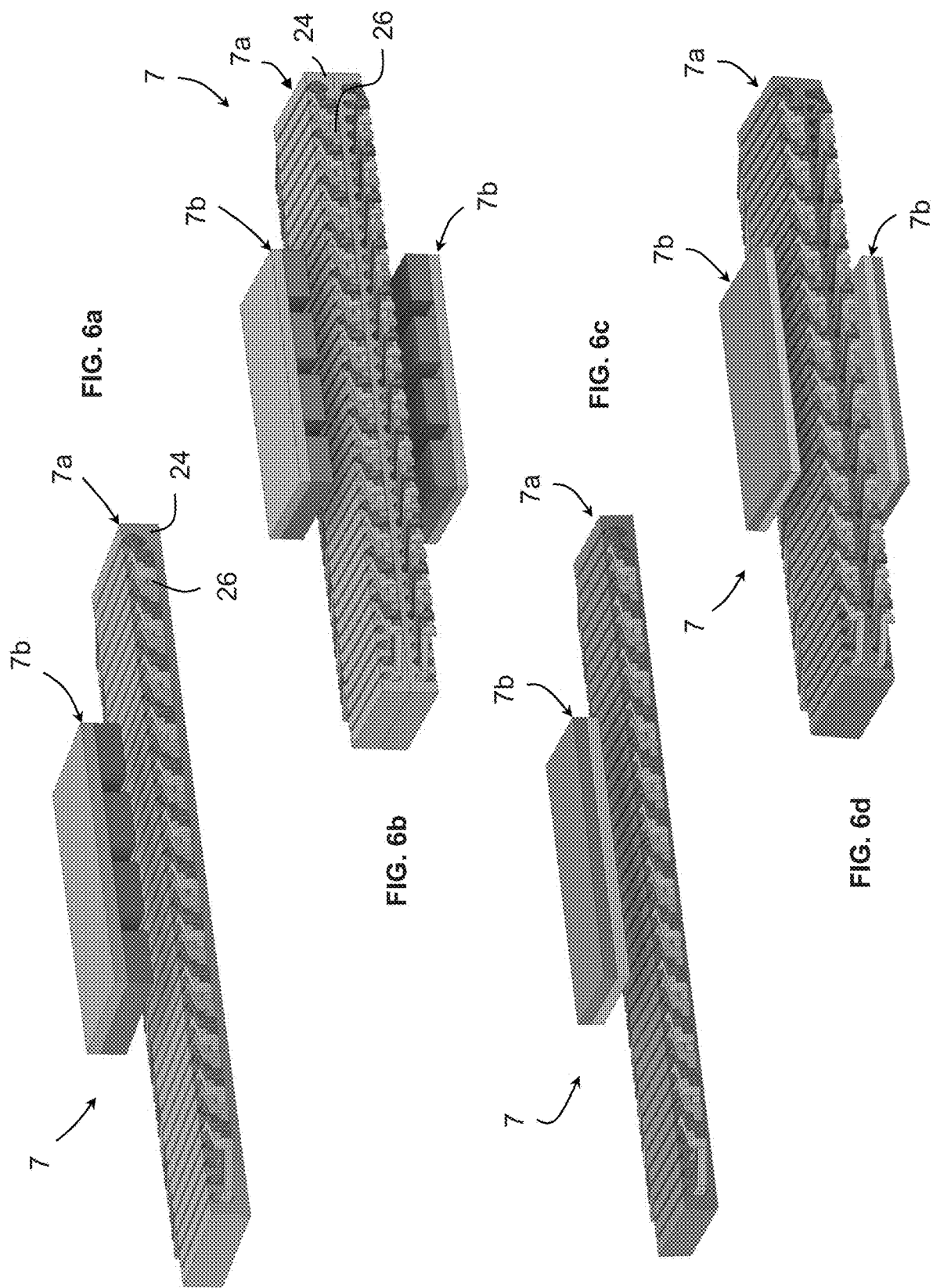

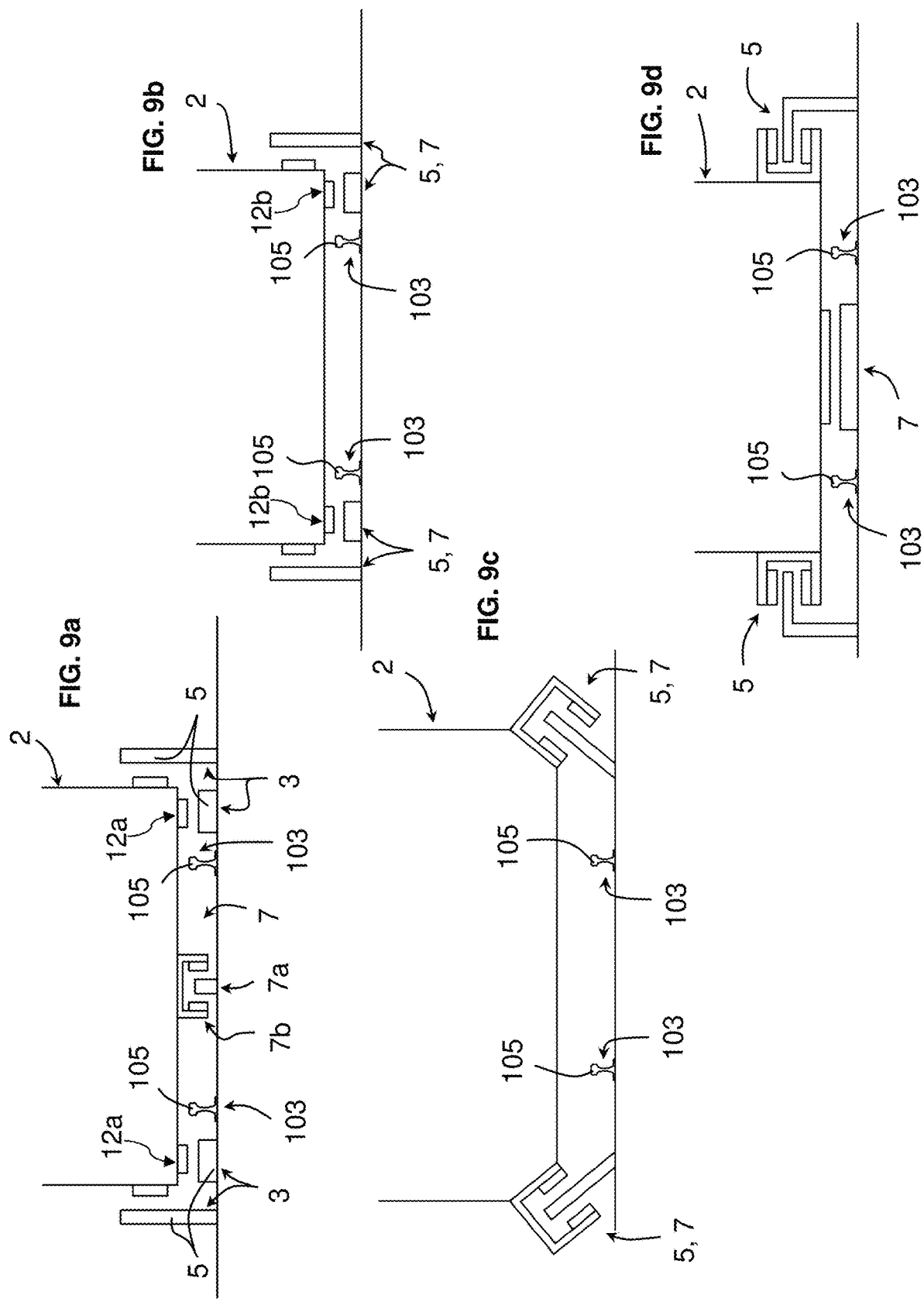

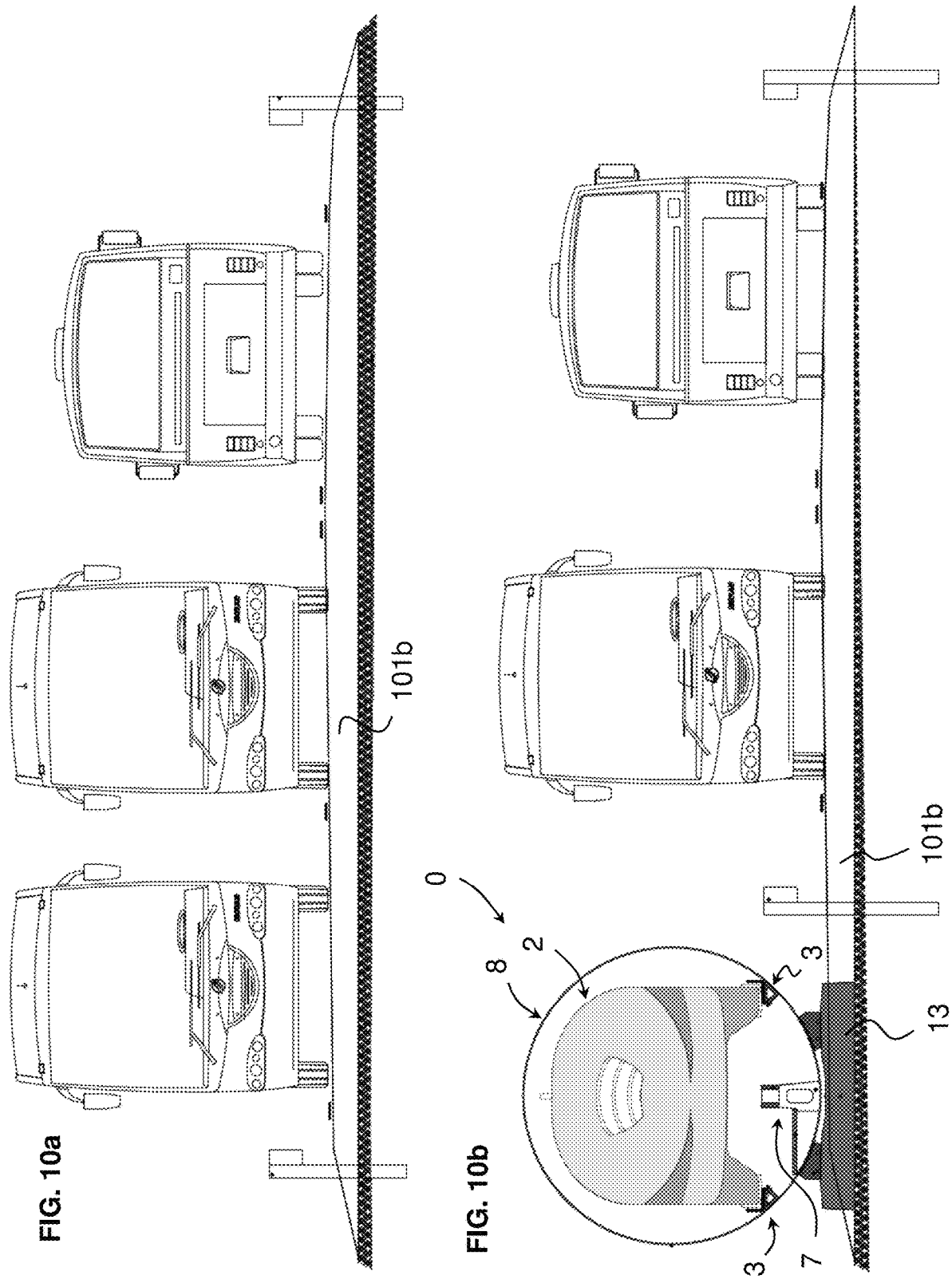

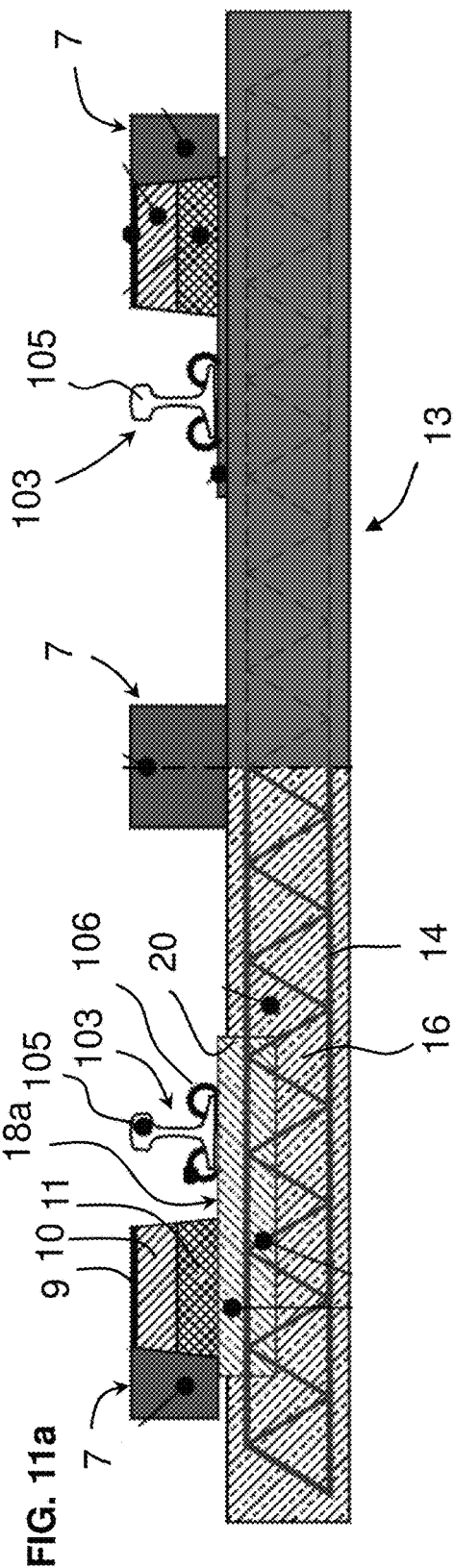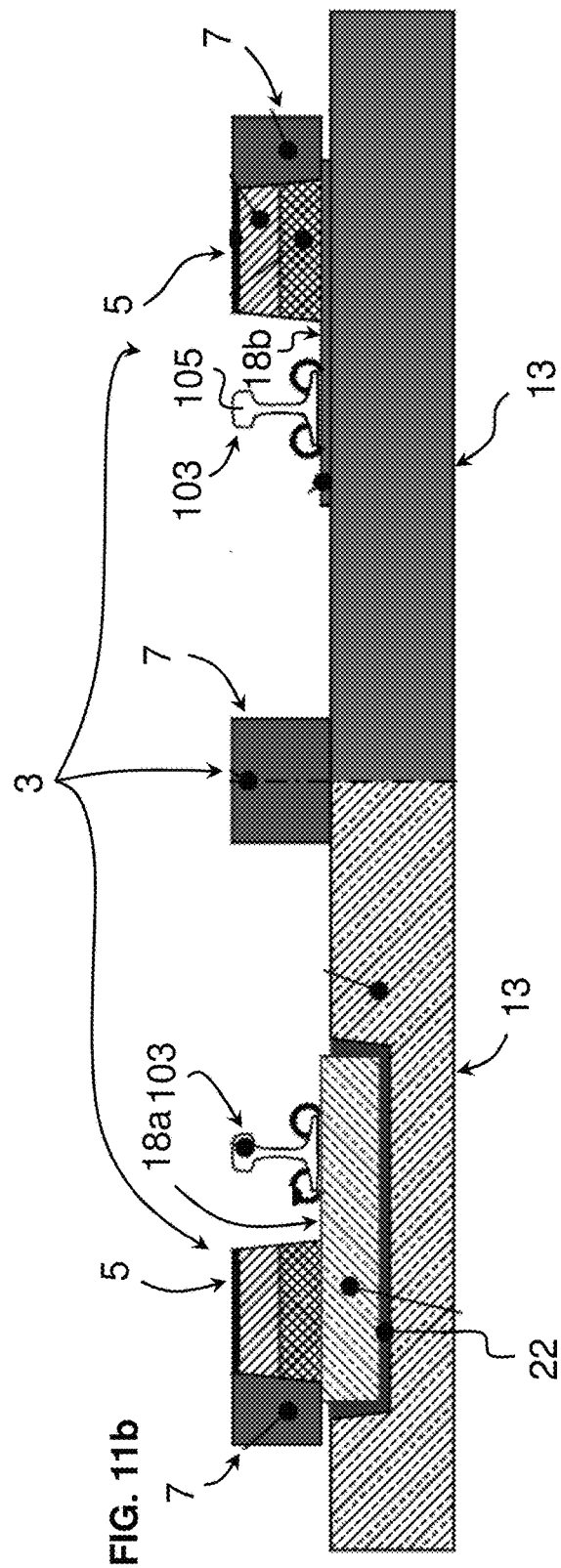

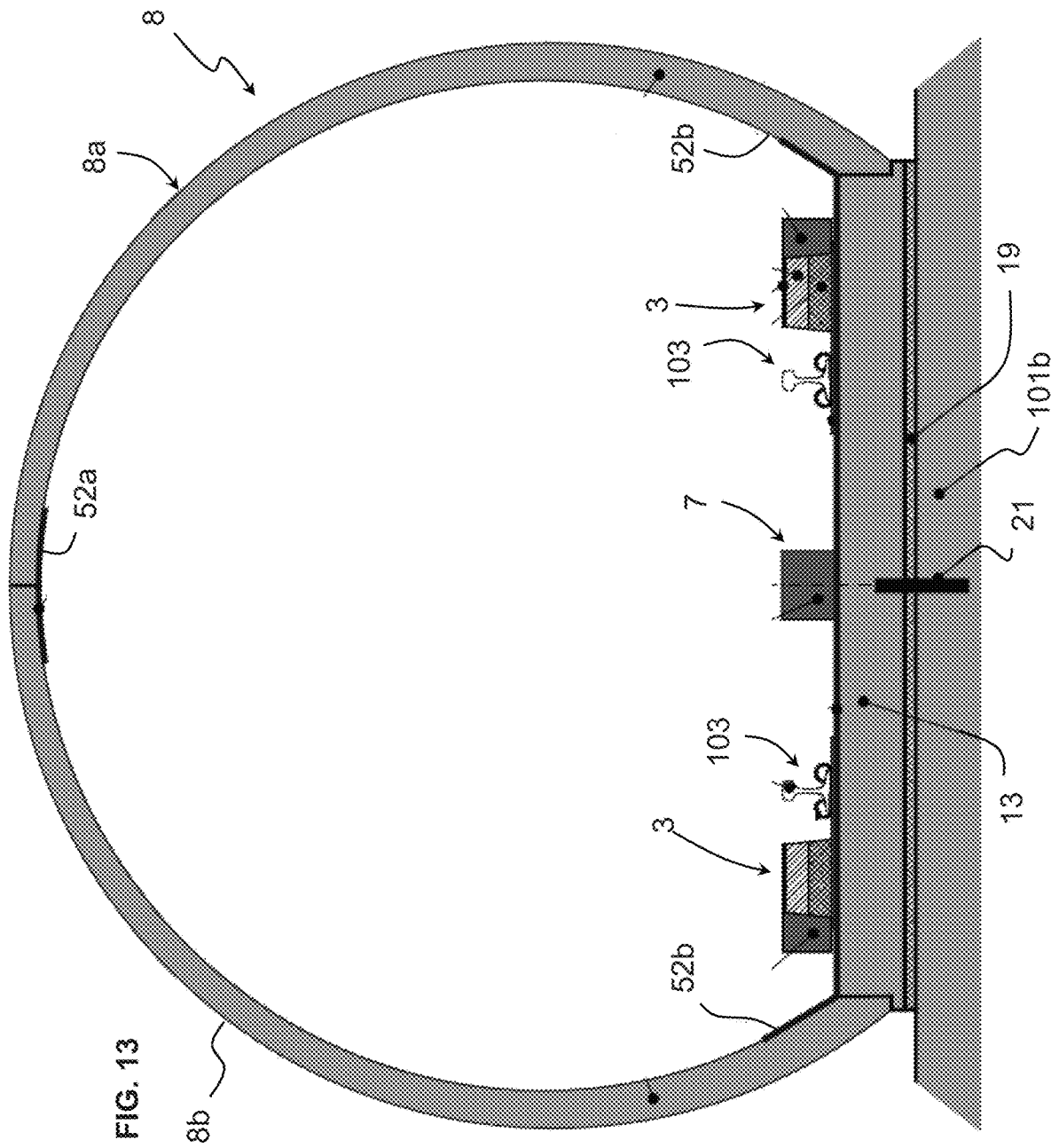

MAGNETIC LEVITATION RAILWAY SYSTEM

CROSS-REFERENCE TO RELATED APPLICATIONS

The present application is a national stage entry of International (PCT) Patent Application Number PCT/EP2019/072304, filed Aug. 20, 2019, which claims priority to Polish Patent Application No. P.426732, filed Aug. 20, 2018, and Polish Patent Application No. P.426733, filed Aug. 20, 2018, the subject matter of which are expressly incorporated herein by reference.

FIELD OF THE INVENTION

The present invention relates to a railway system, in particular a magnetic levitation railway system that may be integrated into an existing railway network or road network.

BACKGROUND OF THE INVENTION

It is known that existing railway networks for trains on wheels may be modified to include railway tracks for a magnetically levitated train. Using an existing railway track infrastructure provides a significant advantage in reducing the costs and time for implementation, although there are some compromises needed since existing infrastructures are usually not optimized for magnetic levitation systems and lead to performance reduction, in particular the possible speeds of the magnetic levitation trains. The ease of implementation, in particular adaptation of the existing network to integrate the magnetic levitation system, with minimal impact on the existing conventional railway track, is an important factor. Considering that existing railway tracks may have various surfaces, ballasted or non-ballasted, adaptation to these varying surfaces along the railway line also need to be taken into account.

SUMMARY OF THE INVENTION

In view of the foregoing, it is an object of the invention to provide a magnetic levitation railway system that can be integrated in existing infrastructure, in particular an existing railway network or an existing road network, that is quick and easy to install, yet provides good performance and reliability.

It is advantageous to provide a magnetic levitation railway system for integration in existing rail or road infrastructure that can be quickly deployed in the existing infrastructure and that can be easily adapted to varying conditions of the existing infrastructure.

It is advantageous to provide a magnetic levitation rail system that can be further upgraded in a cost-effective manner for vacuum tube operation.

The invention is set out in the appended set of claims.

Disclosed herein is a magnetic levitation railway system for integration in a wheel railway track, comprising a magnetic levitation railway track including a linear motor and magnetic levitation rails arranged on outer sides of the wheel railway track, said magnetic levitation rail comprising a conductive guide rail having at least a horizontal portion configured for a magnetic levitation railway vehicle having a levitation device with magnets.

According to a first aspect of the invention, the guide rail is configured for passive levitation of the magnetic levitation railway vehicle due to the electromotive force generated by the moving magnets of the magnetic levitation railway vehicle.

According to a second aspect of the invention, the magnetic levitation railway system is for integration in an unballasted ground support, and comprises a fabricated base plate comprising a reinforcement frame embedded in substrate and magnetic levitation rails mounted on the fabricated base plate, the fabricated base plate mounted on the unballasted ground support via a ground to plate interface layer comprising a deformable stress distributing material.

In an advantageous embodiment, the deformable stress distributing material comprises a polymer or asphalt.

In an advantageous embodiment, the fabricated base plate coupled to the unballasted ground support includes a ground to plate positioning post that registers the position of the fabricated base plate with respect to the unballasted ground support.

In an advantageous embodiment, the ground to plate positioning post is positioned substantially along a center line of the railway track.

In an advantageous embodiment, the fabricated base plate further comprises a fixing insert mounted in a fixing insert receiving portion of the substrate, the magnetic levitation rail being fixed to the fixing inserts, the fixing inserts being discrete and positioned in a spaced apart manner in the direction of the rail track.

In an advantageous embodiment, the system further comprises a conventional wheel railway track mounted thereon, the conventional wheel railway track comprising rails mounted on the fabricated base plate.

In an advantageous embodiment, the rails for the wheel railway tracks are fixed to the fixing inserts.

In an advantageous embodiment, at least one said linear motor is fixed to the wheel railway track along a center line of the track.

In an advantageous embodiment, the linear motor comprises a synchronous motor vertically upstanding for magnetically coupling to magnets positioned either lateral side of the linear motor.

In another embodiment, the linear motor comprises an asynchronous motor vertically upstanding for coupling to conductive plates positioned either lateral side of the linear motor.

In an advantageous embodiment, the magnetic levitation railway track comprises at least one linear motor positioned along and fixed to the magnetic levitation rail.

In an advantageous embodiment, the guide rail comprises a vertical portion extending from the horizontal portion for laterally guiding the magnetic levitation railway vehicle.

In an advantageous embodiment, the system further comprises sleepers comprising a substrate embedding a reinforcement, and anchor elements upstanding from an upper mounting surface of the sleeper, said anchor elements including anchor elements for a conventional rail and further comprising anchor elements for a magnetic levitation rail at outer ends of the sleeper.

In an advantageous embodiment, the guide rail is mounted on a support rail or on a support pillar, the support rail or support pillar being coupled to the sleeper or fabricated base plate.

In an advantageous embodiment, the guide rail is coupled to the support rail including a position adjustment mechanism configured to adjust the vertical height and/or horizontal position of the guide rail.

In an advantageous embodiment, the system further comprises a coupling adaptor comprising a fixation portion configured for mounting to an underside of a conventional rail for wheel railway tracks and further comprising a portion for mounting of the guide rail of the magnetic levitation rail thereon.

In an advantageous embodiment, the coupling adaptor wheel rail fixation portion comprises a receiving profile and a clamping mechanism for clamping to said underside of the wheel rail.

In an advantageous embodiment, the magnetic levitation rail comprises an adaptor-guide interface layer comprising a deformable material for insertion between the guide rail and support rail or coupling adaptor.

In an advantageous embodiment, the adaptor-guide interface layer comprises a polymer material.

Also disclosed herein, according to a third aspect of the invention, is a coupling adaptor for a railway system comprising a magnetic levitation railway track for integration in a wheel railway track, the magnetic levitation railway track including magnetic levitation rails arranged on outer sides of wheel rails of the wheel railway track. The coupling adaptor is configured for mounting on or between sleepers of the railway system and comprises a wheel rail fixation portion comprising a receiving profile having a form adapted for mounting to a bottom portion of a said wheel rail, and a clamping mechanism that can be tightened to securely fix the coupling adaptor to the underside of the wheel rail.

In an advantageous embodiment, the clamping system comprises one or more adjustable clamping hooks.

In an advantageous embodiment, the clamping system comprises a support pillar for mounting of a guide rail of the magnetic levitation rail, and a position adjustment mechanism to adjust the position of the support pillar to thereby adjust the position of the guide rail with respect to the clamping mechanism.

In an advantageous embodiment, the support pillar comprises an inclined adjustment guide surface to adjust the height of the guide rail with respect to the wheel rail. The adjustment guide surface of the support pillar may directly engage an inclined upper mounting surface of the sleeper, or alternatively engage an upper inclined surface of a block mounted fixedly on the sleeper or other structure on which the magnetic levitation rail is mounted.

Further objects and advantageous aspects of the invention will be apparent from the claims, and from the following detailed description and accompanying figures.

BRIEF DESCRIPTION OF THE DRAWINGS

The invention will now be described with reference to the accompanying drawings, which by way of example illustrate embodiments of the present invention and in which:

FIG. 1a is a schematic cross-sectional view of a railway track including a magnetic levitation railway system according to an embodiment of the invention;

FIG. 1b is a schematic view of the railway track of FIG. 1a in cross-section;

FIG. 2 is a schematic view similar to FIG. 1b of a variant;

FIG. 4b is a schematic cross-sectional view of a coupling adaptor for a magnetic levitation rail according to an embodiment of the invention;

FIG. 4c is a view in the direction of arrow IVc of FIG. 4b;

FIG. 4d is a schematic top view of a section of railway track according to an embodiment of the invention;

FIG. 4e is a schematic top view of a section of railway track according to another embodiment of the invention;

FIG. 5b is a top view of the railway sleeper of FIG. 5a;

FIG. 6a is a schematic perspective view illustrating a first embodiment of a linear motor that may be used in a railway system according to an embodiment of the present invention;

FIG. 6b is a view similar to FIG. 6a of another embodiment;

FIG. 6c is a view similar to FIG. 6a of yet another embodiment;

FIG. 6d is a view similar to FIG. 6b of yet another embodiment;

FIGS. 9a to 9d are simplified schematic illustrations of various configurations of a magnetic levitation railway system according to different embodiments of the invention;

FIG. 10a is a schematic illustration in cross-section showing a conventional road;

FIG. 10b is a view similar to FIG. 10a showing a magnetic levitation railway system integrated in a conventional road;

FIG. 11a is a schematic partial cross-sectional view of a railway track according to another embodiment of the invention;

FIG. 11b is a view similar to FIG. 11a in another cross-sectional lane;

FIG. 13 is view of another embodiment of a railway system with the embodiments of FIGS. 11a and 11b further including a vacuum tube.

DETAILED DESCRIPTION OF EMBODIMENTS OF THE INVENTION

Figure 3:
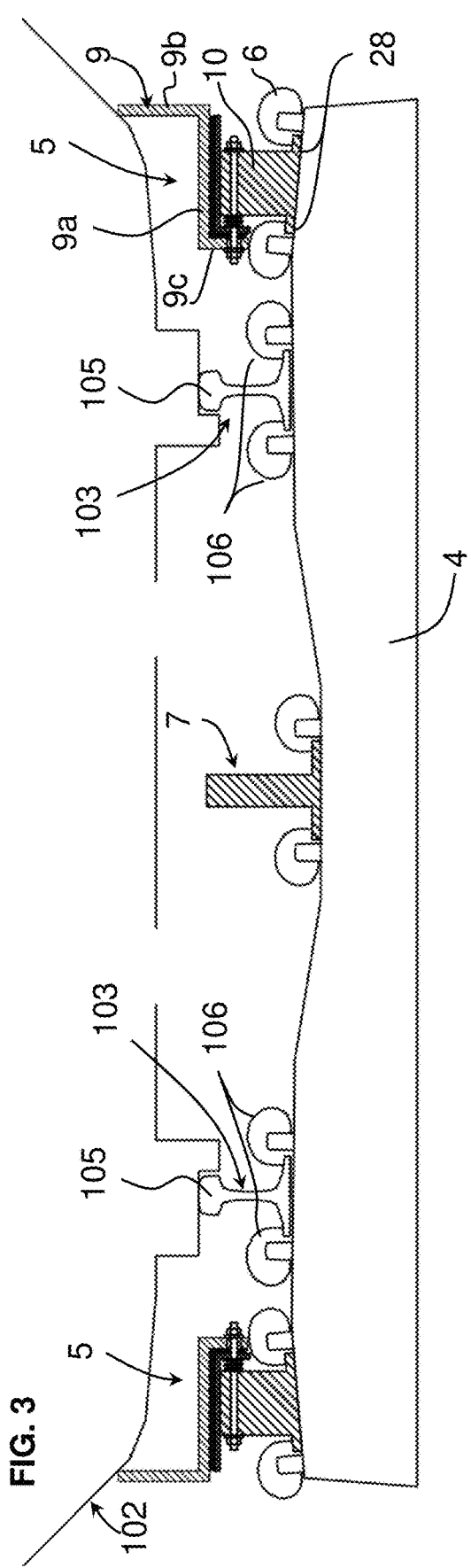
FIG. 3 is a schematic view similar to FIG. 1a of an embodiment of the invention.
Figure 4A:
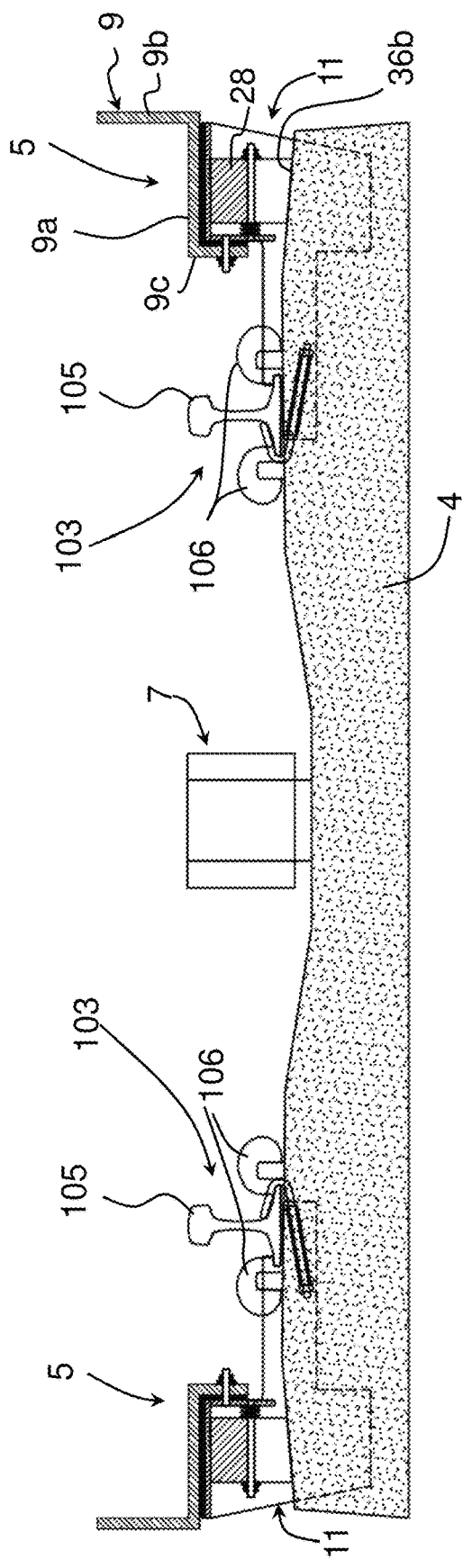
FIG. 4a is a schematic view similar to FIG. 1a of another embodiment of the invention.

Referring to the figures, a railway system is illustrated including a conventional wheel railway track 103 for guiding conventional wheel railway vehicles 102, and a magnetic levitation railway track 3 according to embodiments of the invention for guiding magnetic levitation railway vehicles 2. The magnetic levitation railway track 3 may be integrated in an existing conventional wheel base railway system or may incorporate a conventional wheel-based railway system in a newly installed infrastructure. The railway system may include sections of existing conventional railway tracks and new sections as part of a same network or along an existing line, for instance certain sections of an existing line may be replaced by new sections depending on the state of maintenance of the railway system. Embodiments of the invention thus allow either upgrading, replacement, or installation of new sections of a railway network in a fully integrated and seamless manner.

The railway tracks 103, 3 are supported on a track ground support that may be either ballasted, namely on a base comprising gravel and stones 101a, or may be an unballasted support 101b such as concrete or asphalt that may form part of a road surface for motor vehicles, or other infrastructures elements, for instance bridges and tunnels and other engineered structures.

A conventional wheel railway track 103 on a ballasted ground support 101a comprises sleepers 104 that will generally be made of a pre-stressed reinforced concrete or, particularly in older infrastructures, of a wooden beam. Rails 105 are fixed to the beams by fixation mechanisms 106, such features being per se well-known and need not be described in detail herein.

A magnetic levitation railway track 3 according to embodiments of the invention comprises a magnetic levitation rail 5 for guiding the magnetic levitation railway vehicle 2, and a linear motor 7 for providing the propulsion force to drive the magnetic levitation railway vehicle 2. The magnetic levitation railway track 3 may be supported on a conventional existing sleeper 104, or a sleeper 4 according to an embodiment of the invention, or on a fabricated base plate 13 according to an embodiment of the invention. All or some of the above embodiments may be found on a railway line along different sections thereof depending on the state of the existing infrastructure.

The magnetic levitation rails 5 are mounted on outer sides of the conventional rails 105 having an overall height that is less than the bottom of the conventional wheel railway vehicle 102 which follows per se well-known standards, e.g structure gauge. Each magnetic levitation rail 5 comprises a guide rail 9 that may have different profiles depending on the embodiment The guide rail is mounted on a support that may be in the form of a continuous rail 10, or of discrete pillars 28 of a coupling adaptor 11, optionally via an adaptor-guide interface layer 42. The guide rail 9 and support rail 10 or coupling adaptor 11 are coupled to the sleeper 4 or 104 or fabricated base plate 13 depending on the embodiment.

In a first embodiment as illustrated in FIG. 3, the guide rail 9 and support rail 10 are coupled directly on the sleeper 4.

In other advantageous embodiments as illustrated in FIGS. 4a to 4e, a coupling adaptor 11 is provided for supporting the guide rail 9, the coupling adaptor 11 configured for mounting to the rails 105 of a wheel railway track 103.

The coupling adaptor 11 in a first embodiment may be mounted on sleepers 4 as illustrated in FIG. 4d, or on a non-ballasted support (e.g. road surface). In a second embodiment the coupling adaptor 11 is mounted between sleepers 4 (in the direction of the track) as illustrated in FIG. 4e. The second embodiment may be used in the situations where the existing railway sleepers are not well adapted for mounting the magnetic levitation track on the outer extremities thereof, or for easier and more rapid deployment of the magnetic levitation railway track along ballasted ground supports 101a.

The coupling adaptor 11 according to an embodiment of the invention as best illustrated in FIGS. 4b and 4c, comprises a wheel rail fixation portion 30 comprising a receiving profile 38 having a form adapted for mounting to a bottom portion of a conventional rail 105, and a clamping mechanism, for instance in the form of one or more adjustable clamping hooks 40, that can be tightened to securely fix the coupling adaptor 11 to the underside of the conventional rail 105.

The coupling adaptor 11 may be fixed to a section of rail between sleepers 4 as illustrated in FIG. 4e or on sleepers 4 as illustrated in FIG. 4d, the sleepers being supported for instance on a ballast surface, by removing the gravel and stones underneath the section of rail where the clamping mechanism is positioned.

The coupling adaptor 11 may be installed on or between every sleeper, or may be installed every second or third sleeper. In other words, coupling adaptors may be separated in the direction of the rail 5 by one or more sleepers where no coupling adaptor is mounted.

In the embodiment illustrated in FIGS. 4b, 4c, a pair of clamping hooks 40 are provided, arranged in opposite sides of the support pillar 28.

The coupling adaptor 11 further comprises a support pillar 28 for mounting of the guide rail 9. The support pillar 28 may comprise, in an embodiment, an adjustment guide surface 36a that forms part of a position adjustment mechanism 32 that further comprises an adjustment screw 34 to adjust the position of the guide rail 9 with respect to the clamping mechanism 40 and receiving profile 38 of the wheel rail fixation portion 30. A spring 44, for instance made of plate springs, may be comprised in the adjustment mechanism to elastically bias the support pillar 28 against the adjustment screw.

In the illustrated embodiment of FIG. 4b, the adjustment guide surface 36a of the support pillar 28 directly engages an inclined upper mounting surface 36b of the sleeper 4, or alternatively, engages an upper inclined surface of a block (not shown) mounted fixedly on the sleeper or other structure on which the levitation rail 5 is mounted.

In the illustrated embodiment of FIGS. 4c and 4b, the adjustment guide surfaces 36a, 36b are inclined slightly with respect to a horizontal line such that a displacement of the support pillar 28, by turning the adjustment screw 34, either raises or lowers the guide rail 9. The height of the guide rail 9 along the railway track can thus be adjusted relative to the rail 105 of the wheel railway track 103 to take into account irregularities and manufacturing tolerances of the base of the rail that may change slightly the position of the wheel rail fixation portion 30 and its angle relative to the positioning angle of adjacent coupling adaptors in nearby portions of the railway track.

A further position adjustment mechanism may be provided between the guide rail 9 and support rail 10 or coupling adaptor 11 in order to adjust the lateral position of the guide rail 9. It may be noted in variants (not shown) that the position adjustment mechanism for adjusting the height and/or lateral position may be provided between the guide rail 9 and support rail 10 or coupling adaptor 11, alternatively or in addition to a position adjustment mechanism between the support pillar 28 and the sleeper 4.

The adaptor-guide interface layer 42 may be made of a polymer or composite material or other material allowing some flexibility between the guide rail 9 and support rail 10 or the coupling adaptor 11. This may be helpful to dampen local stresses in the contact between the guide rail and support rail and/or to dampen vibration and movement between the guide rail and support rail or coupling adaptor 11.

The adaptor-guide interface layer 42 may also advantageously act as a dielectric separation between the guide rail and support rail or coupling adaptor 11. This may aid in reducing galvanic corrosion between metals, in particular an aluminium-steel interface. The dielectric layer may also improve and optimize the magnetic levitation force caused by eddy currents due to the passing of the magnetic field on the vehicle that generates an electromotive force causing levitation.

In the embodiment illustrated in FIG. 3, the support rail 10 is illustrated as being directly mounted on the sleeper 104, 4 by fixation means 6 that may be provided in various forms, for instance by bolts and clamps as per se well-known for fixing conventional railway lines, or by welding or bonding directly to the sleeper, for instance by means of an appropriate adhesive adapted for high load applications in external environments.

In a variant (not shown), a coupling adaptor may be inserted between the support rail and the sleeper, the coupling adaptor for instance comprising a position adjustment mechanism allowing adjustment of the height and/or lateral position of the support rail and therefore also of the guide rail 9.

In the illustrated embodiments, the guide rail is shown essentially in the form of a flat bar or plate having a horizontal portion 9a for guiding the vertical position of the magnetic levitation vehicle, and in advantageous embodiments it may further comprise a vertical portion 9b for guiding the lateral (horizontal) position of the magnetic levitation vehicle. On an inner side a further vertical portion 9c may be provided for fixing the guide rail to a support rail 10 or to a support pillar 28.

The guide rail 9 is formed of a conductive material in order to generate an electromotive force that pushes up the levitation element of a moving magnetic levitation railway vehicle 2 according to a well-known physical principle of electromotive force generated by a moving magnetic field in the proximity of an electrical conductor. The levitation system according to an aspect of the invention is therefore a passive system whereby a levitation force is generated by a magnetic levitation element on the magnetic levitation railway vehicle 2 once it is moving at a certain velocity to generate a levitation force that lifts the vehicle out of contact with the guide rail 9.

The magnetic levitation railway vehicle 2 is thus provided with wheels or slides (not shown) allowing it to slide or roll along the guide rail 9 until a certain velocity is achieved. In practical examples, the velocity at which a sufficient levitation force may be generated would typically be in a range of 40-60 km per hour. In view of the relatively low velocity at which the levitation vehicle is in contact with the guide rail 9, and further considering that even before lift off a levitation force reduces the weight of the vehicle being applied on the guide rail, the wheels of the magnetic levitation vehicle do not need to have a high mechanical strength and resistance in comparison to conventional wheels of railway vehicles. They may thus be smaller and lighter, for instance formed of a polymer material or polymer composite material, or a metal coated with a polymer material that prevents excessive pressure and damage to the guide rail. In preferred embodiments, the surface material of the wheels of the magnetic levitation vehicle has a hardness that is lower than the hardness of the conductive material forming the guide rail 9.

Preferred materials for the guide rail 9 include steel and aluminium alloys. Other conductive materials may however be used, for instance copper alloys. The guide rail 9 may also be formed of a plurality of materials in a stacked structure, for instance a metal on a composite material bonded together.

The guide rail 9 may be formed by extrusion, rolling, and other per se known forming processes. The guide rail, in certain embodiments, may be supplied already mounted to a section of support rail 10 or mounted in situ on a separate support rail. The guide rail 9 is formed preferably of a non-magnetic material in order not to become magnetically polarized and thereby reducing hysteresis.

The support rail 10, in certain embodiments, may be a continuous rail or may be provided in sections with spaces or without spaces.

Considering that the guide rail 9 acts principally as a levitation surface, it may also be provided in sections that are either directly coupled together or not coupled directly together to allow thermal expansion of the guide rail and the support rail in order to adjust for different thermal dilatation between the wheel rail, the ground, and the magnetic levitation rail.

Although the guide rail 9 is shown as a component with substantially flat horizontal and vertical sections, it may have various complex shapes and further be directly incorporated or integrally formed with a support rail 10 so as to form a single rail, without departing from the scope of this invention.

Figure 8A:
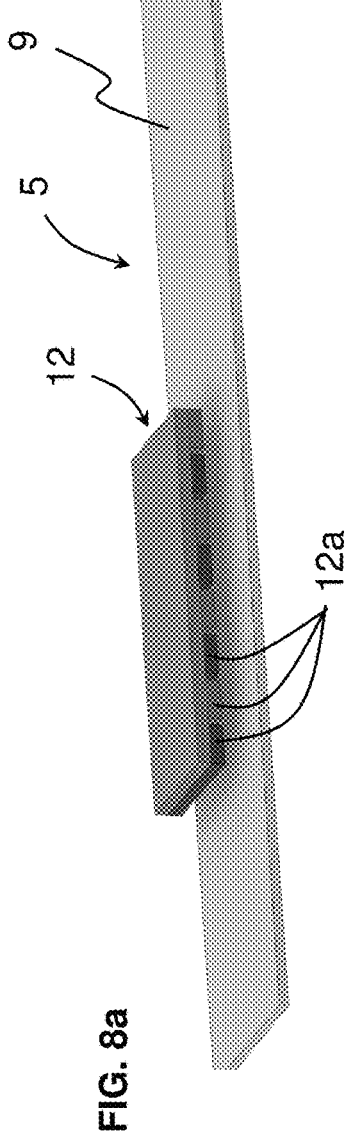
FIG. 8a is a schematic perspective view of part of a magnetic levitation rail of a railway system according to an embodiment of the invention.
Figure 8C:
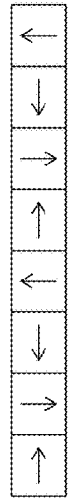
FIGS. 8b and 8c are schematic representations of the polarization of the magnets of a magnetic levitation element mounted on a railway vehicle according to embodiments of the invention.
Figure 8B:
Figure 12:
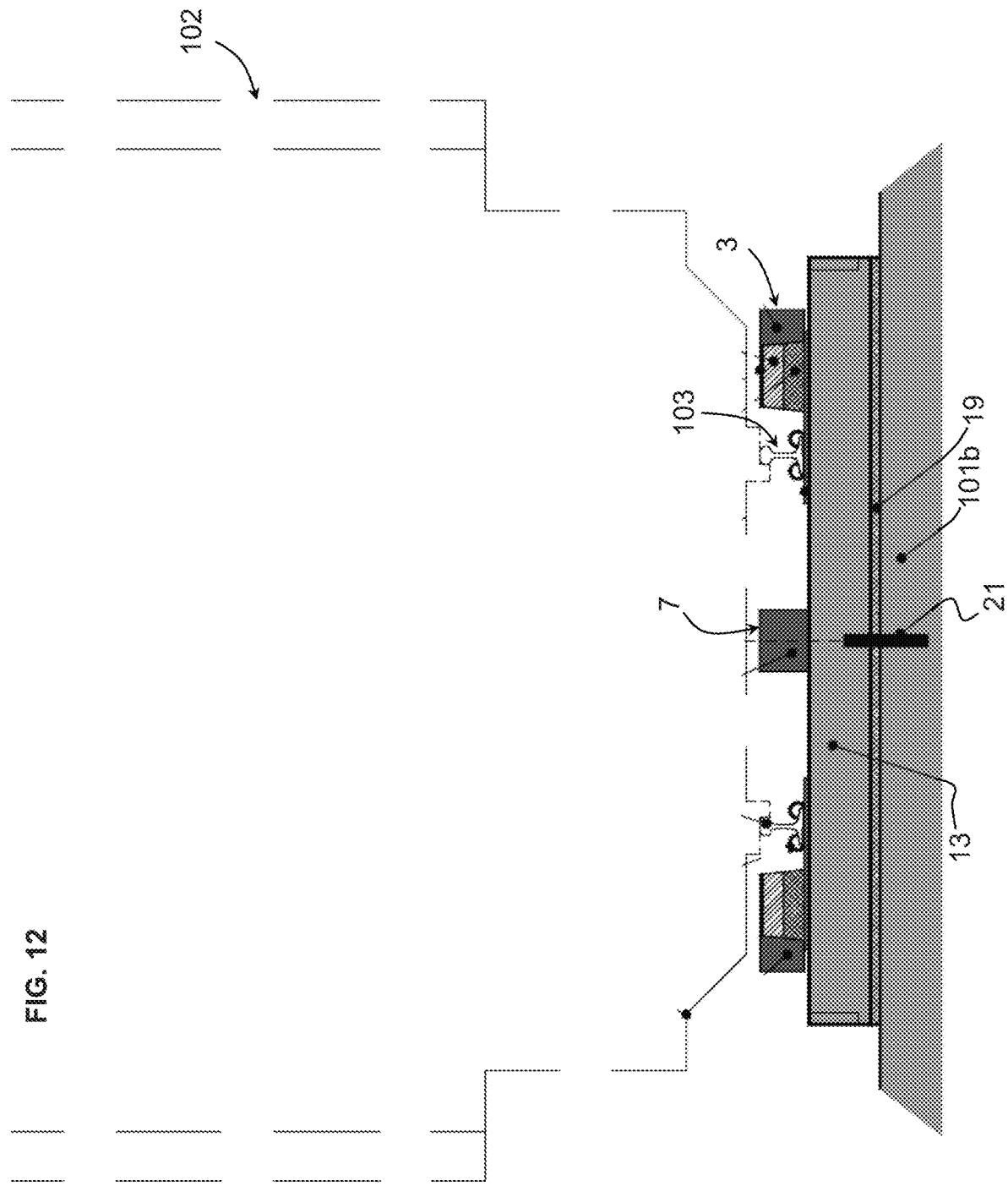
FIG. 12 is a schematic representation of a railway system with the embodiments of FIGS. 11a and 11b.

As illustrated in FIG. 8a, the magnetic levitation device 12 on the magnetic levitation railway vehicle 2 comprises magnets 12a which may in a preferred embodiment be in the form of permanent magnets having alternating polarization, for instance as illustrated in FIG. 8b with a 180° change of direction between magnetic poles, or with a 90° change in direction of magnetic poles as illustrated in FIG. 8c (corresponding to the known Halbach array). Other magnetic pole arrangements are however possible, for instance with segments having a 45° or 30° rotation with respect to adjacent segments. The railway vehicle may however be provided with electromagnets 12b, such as propulsion electromagnets, instead of permanent magnets 12a or in addition to the permanent magnets. In the latter embodiment, this may be useful in order to create a higher magnetic levitation force at lower speeds, whereby the electromagnets can be turned off at higher speeds, or turned on.

In embodiments, a railway vehicle may comprise for instance various configurations, such as:
1. START/SLOWING-DOWN—the linear motor is powered from an external power source due to a high energy consumption. Permanent magnets 12a for levitation and stabilization are present as for instance schematically illustrated in FIG. 9a.
2. CRUISE or SPEED BOOSTING (in vacuum system)—to maintain a substantially constant speed, a high power motor is not necessary, so the propulsion electromagnets 12b on railway vehicle are turned on and may act to provide propulsion and levitation simultaneously, as for instance schematically illustrated in FIG. 9b. In such case the power is typically three to five times smaller than peak power during acceleration.
3. In vacuum system (not considering emergency situations) the vehicle may be accelerated by the linear motor, and subsequently be driven (coasting) at low power consumption about forty to one hundred times smaller than the peak power of linear motor while accelerating due to the low air resistance.

Conductive plates for the mobile elements, for instance of aluminium, may be used for levitation and propulsion during coasting. The energy to power onboard electromagnets may come from batteries, fuel cells, wireless power transfer, pantograph, or any combination thereof.

Advantageously, the use of a passive levitation system whereby the magnetic levitation train has wheels that may rest at low speeds on the magnetic levitation track or alternatively on another track (for instance on the existing conventional wheel rail track), is very simple to integrate into an existing railway network and avoids the complications of providing coils in a levitation track. Coils in an active levitation system increase the complexity and costs of installation as well as reducing the reliability of the system in case of failure of any section of the active levitation track. Mechanical mounting and adjusting of the guide rail as well as adjustment of heights, is significantly simplified by such passive levitation system, and moreover it is easier to provide a system with greater robustness and durability if coils are avoided in the guide rail.

The provision of the guide rails on outer sides of the existing conventional railway lines is also advantageous in that it has a high stability against roll of the magnetic levitation vehicle. It may be noted that the use of the terms "horizontal" and "vertical" are intended to include some inclination of a few degrees in order to allow for inclination of the magnetic levitation vehicle in curves of the railway track.

Figure 5A:
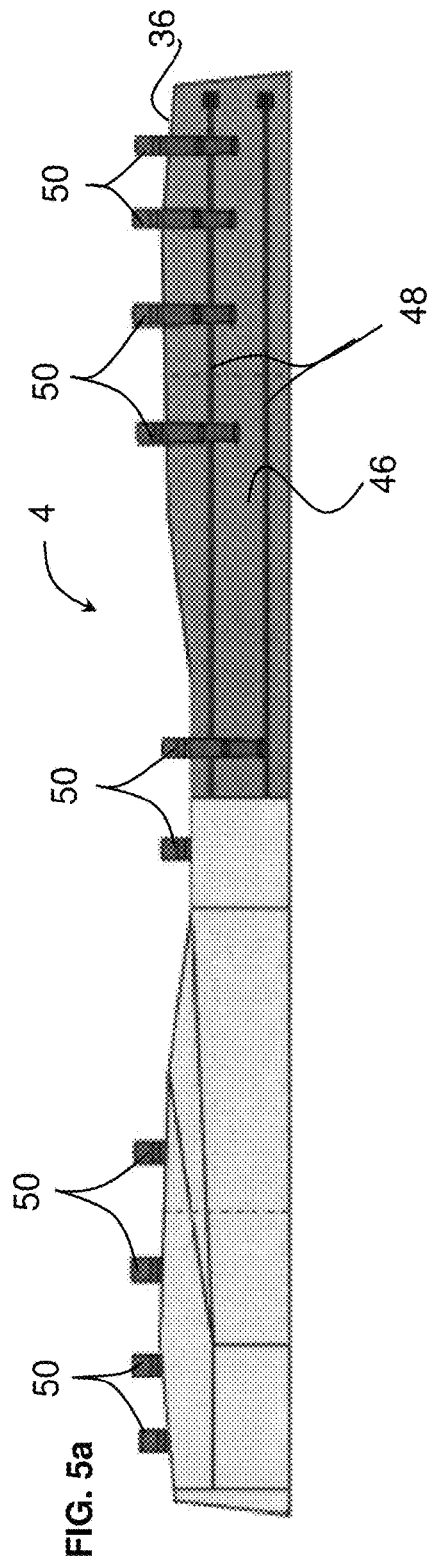
FIG. 5a is a side and partial cross-sectional view of a railway sleeper of a railway system according to an embodiment of the invention.
Figure 5B:
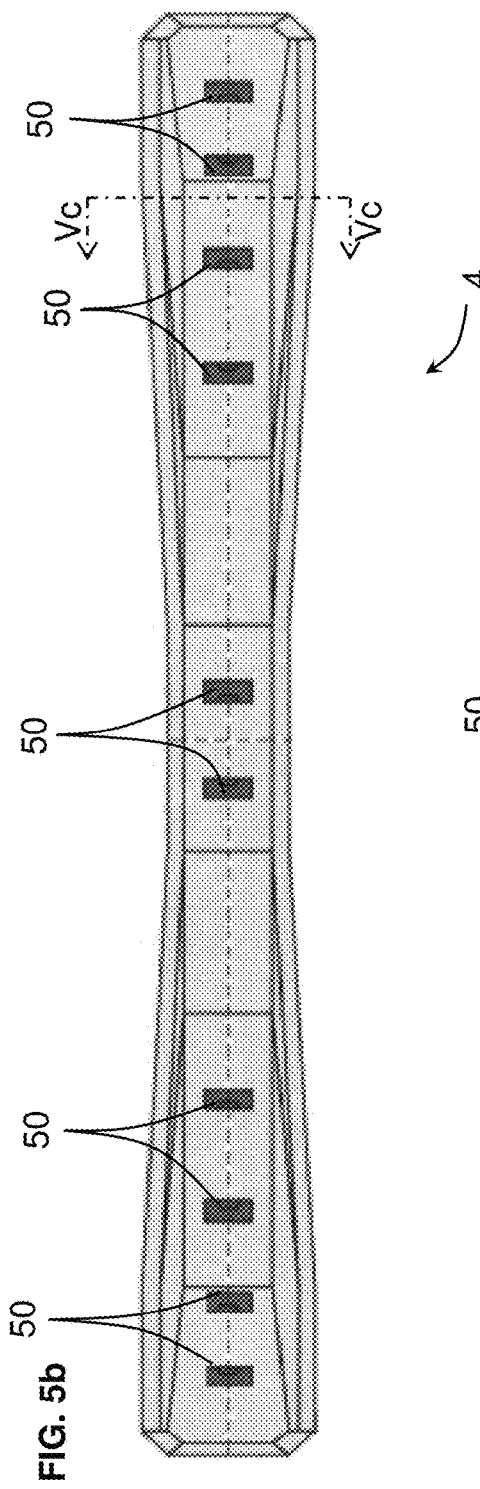
Figure 5C:
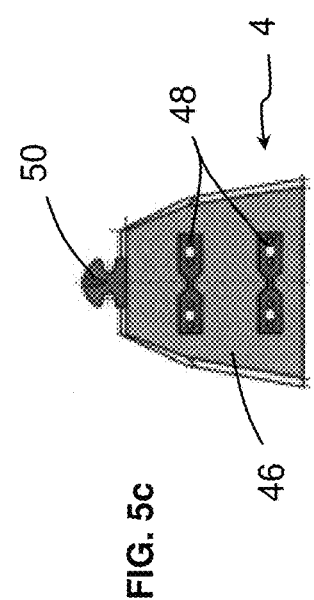
FIG. 5c is a cross-sectional view through line Vc-Vc of FIG. 5b.
Figure 7A:
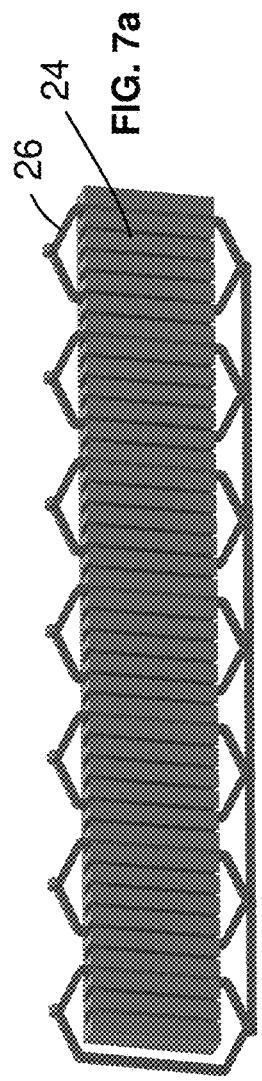
FIG. 7a is schematic perspective view of a winding of one phase of a linear motor according to an embodiment of the invention.
Figure 7B:
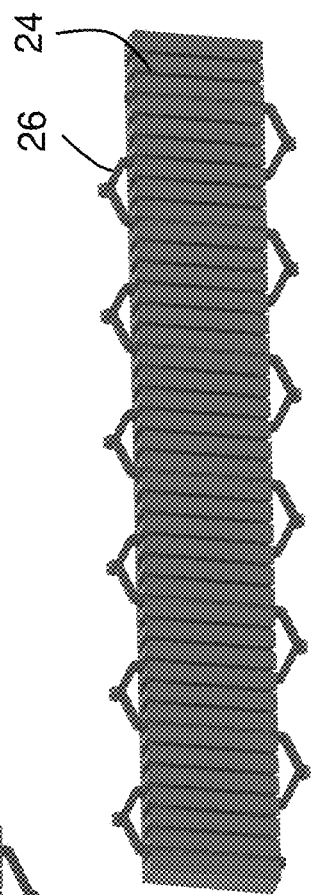
FIG. 7b is a view similar to FIG. 7a of another variant.

Referring to FIGS. 5a to 5c, a sleeper 4 according to an embodiment of the invention for new installations comprises a substrate, in particular a concrete substrate 46 with reinforcements 48 as per se known. The sleeper further comprises a plurality of anchor elements 50 embedded in the substrate and having a portion projecting beyond a top mounting surface of the sleeper in order to provide fixation elements for both conventional rails and in addition for magnetic levitation rails on the outer ends of the sleeper.

Referring to FIGS. 6a to 6d, various configurations of a linear motor that may be employed in a railway system according to the embodiments of the invention are illustrated. In FIG. 6a, the linear motor comprises an armature 24 holding a plurality of coils 26 wound in the armature in a per se known manner for a linear motor. There may typically be groups of three coils, one for each of a three-phase system.

The armature may be made of a ferromagnetic material (iron) or may be non-ferromagnetic (ironless). In a preferred embodiment, the armature is ironless. The coils may be made of wires, cables or cut and bent copper plates.

The linear motor 7 comprises a stator 7a that may be mounted along the center line of the railway track as illustrated in FIGS. 1a, 1b, 3 and 9a, the railway vehicle comprising a mobile element 7b with permanent magnets or with electromagnets that magnetically couple with the linear motor to provide a force as per se well-known.

In the configuration of FIG. 6b, two sets of coils are provided and the mobile magnetic elements 7b are provided on opposing sides of the linear motor stator 7a, this generally being the preferred configuration in view of the higher power that can be generated compared to a system that is one sided as shown in FIG. 6a.

FIGS. 6a and 6b illustrate synchronous motors, however the linear motor may also be of the asynchronous type as illustrated in FIGS. 6c and 6d, where the mobile element is an electrically conducting element to generate a force by induction.

The various configurations of linear motors are per se well-known and do not need to be described in much detail herein.

In a preferred embodiment, the linear motor is advantageously placed along the center line of the conventional railway track and may be installed independently of the magnetic levitation railway track 3 for quick and easy installation and without any interference with the conventional railway vehicle 102. Preferably, the motor configuration of FIG. 6b where the stator 7a of the linear motor is vertically upstanding between mobile magnetic elements 7b of the magnetic levitation railway vehicle 2. An advantage is that height of the linear motor does not need accurate adjustment, whereby it is easier to adjust the lateral position accurately between the railway tracks than the height.

It would however be possible within the scope of the invention to have a motor arrangement as illustrated in FIG. 9d with the motor corresponding to FIG. 6a or 6c, where the stator of the linear motor is arranged laying horizontally, coupling to a magnetic mobile element that also is horizontally arranged at the base of the magnetic levitation railway vehicle 2. In another embodiment, it is also possible, as illustrated in FIGS. 2 and 11a to 13, to have linear motors arranged along and coupled to the magnetic levitation rails 5 on one or on both sides, whereby the positioning of the motor relative to the railway vehicle is well controlled in view of the fixed position with respect to the guide rail 9. This motor may be a substitute for the linear motor along a center line, or may be in addition as illustrated in FIGS. 11a to 13. The additional linear motors may be used either be to adapt to vehicles with different systems, in other words to adapt to railway vehicles that have a linear motor in the middle or a linear motor on the outside, or alternatively may be used to have a plurality of motors to increase the force, especially during acceleration or for braking the magnetic levitation train. In order to generate a high braking force by electromagnetic means, the use of a plurality of linear motors may be particularly advantageous.

In addition to installing a magnetic levitation railway track along an existing conventional railway track, it is also possible to employ the principles of the present invention for easy integration of the magnetic levitation railway system along an existing road infrastructure, for instance as illustrated in FIGS. 10 and 10b. In FIG. 10a, a road or highway is illustrated with e.g. three lanes, whereby it can be modified to use one lane for a magnetic levitation railway system. In the latter case, the magnetic levitation railway system may advantageously comprise a vacuum tube 8. The various features of a magnetic levitation rail 5 as described above may be also be employed in a system with a vacuum tube.

When mounting on an existing unballasted ground support 101b that may be formed of concrete or asphalt, according to an aspect of the invention, a fabricated base plate 13 is provided for mounting on the unballasted ground support 101b via a ground to plate interface layer 19. The ground to plate interface layer may be made of asphalt, of a polymer, or other deformable material that provides a certain stress distribution and damping connection between the fabricated base plate 13 and the unballasted ground support 101b.

A registering element 21, for instance in the form of a ground to plate positioning post may be provided at discrete positions or as a continuous or intermittent rail proximate the center line of the fabricated base plate in order to anchor and position the base plate with respect to the unballasted ground support 101b.

The deformable ground plate interface layer 19 advantageously absorbs differences in planarity between the surfaces and also allows a better distribution of stress between the base plate and ground.

The fabricated base plate 13 is provided in dimensions that allows conventional transport thereof by rail or road and typically have a width of 2 to 10 meters and a length of 2 to 12 meters. On the fabricated base plate, a plurality of fixing inserts 18 may be provided spaced apart in the direction of the track. The fixing inserts 18a, 18b are configured for the fixing of the magnetic levitation railway track 3 thereto, and additionally for fixing of the rail 105 of the wheel railway track 103 if such wheel railway track is also provided in the combined system. The fixing inserts 18a, 18b may be mounted inside a fixing insert receiving portion 20 provided in a substrate 16 of the fabricated base plate. Optionally an insert mounting interface 22 may be provided between the fixing insert and receiving portion for damping and/or stress distribution between the fixing insert and the substrate 16. The insert mounting interface 22 may be made of polymer, asphalt or other deformable material.

The fixing insert may also be adjusted in height and inclination angle with respect to the substrate 16 of the fabricated base plate 13 in order, for instance, to provide a slight angle inclination of the railway tracks, in particular for curves in the railway line.

The fabricated base plate 13 comprises the substrate 16 and a reinforcement frame 14 in one or more parts embedded within the substrate 16. In an embodiment, the reinforcement frames 14 are produced in a factory and taken to the installation site, the substrate 16 being subsequently poured in situ around the reinforcement frames 14. In an alternative arrangement, the reinforcement frame 14 and substrate 16 may be formed as a prefabricated component in a factory, or at a location that is separate from the installation site, and transported to the installation site for mounting on the ground support.

The reinforcement frame 14 is preferably made of a metal structure to provide reinforcement to the concrete.

In an advantageous embodiment as illustrated in FIG. 13, a vacuum tube 8 may be mounted to the fabricated base plate 13 in order to create a partial vacuum inside the tube to reduce air resistance for the passage of magnetic levitation railway vehicles 2. Wheel railway vehicles may also benefit from the reduced air resistance provided, they have pressurized compartments. The wheel rails may alternatively or in addition serve to transport a service vehicle with wheels that travels at lower velocities than the magnetic levitation vehicle. The wheel rails may alternatively or in addition serve for a magnetic levitation vehicle fitted with additional steel wheels interoperable with a conventional wheel track railway infrastructure, so that after leaving a vacuum tube, the vehicle may travel in a conventional manner on wheels.

Vacuum tube systems for railway vehicles are per se known. In embodiments of the present invention, the vacuum tube may advantageously comprise at least two wall portions 8a, 8b that are assembled together and joined together at a top end, and joined at a base end to outer lateral edges of the fabricated base plate 13. After assembly of the wall portions 8a, 8b to the base plate 13 to form the tube, sealing layers 52a, 52b may be bonded or coated at the joining interfaces in order to provide a substantially hermetic seal for the partial vacuum. The sealing layer may be made of a polymer material that is designed to fill cracks in a hermetic manner.

LIST OF REFERENCES

Railway system 0
  ballasted (gravel, stones) 101a
  unballasted (concrete, asphalt, . . . ) 101b
  fabricated base plate 13
    reinforcement frame 14
    substrate (e.g. concrete) 16
      fixing insert receiving portion 20
    fixing inserts 18a, 18b
      insert mounting interface 22
    ground to plate interface layer 19
    ground to plate positioning post 21
wheel railway vehicle 102
wheel railway track 103
  sleeper/unballasted rail support 104, 4
  rail (for wheel) 105
  fixation mechanism 106
magnetic levitation railway vehicle 2
  levitation device 12
    magnets 12a
magnetic levitation railway track 3
  conventional sleeper 4
  sleeper (according to an embodiment of the invention) 4
    substrate (concrete) 46
    tension-rod reinforcement 48
    anchor elements 50
    inclined guide surface 36b
  fixation mechanism 6
  magnetic levitation rail 5
    guide rail 9
    support rail 10
    coupling adapter 11
      support pillar 28
      wheel rail fixation portion 30
        receiving profile 38
        clamping hook 40
      position adjustment mechanism 32
        adjustment screw 34
        adjustment guide surface 36a
        spring 44
    adapter-guide rail interface layer 42
  linear motor 7
    stator 7a
      armature 24
      coil 26
    mobile element 7b
      permanent magnets 12a
      propulsion electromagnets 12b
      induction plate
  vacuum tube 8
    wall portions 8a, 8b
    base end
    top end
    sealing layer 52a, 52b

The invention claimed is:

1. Magnetic levitation railway system for integration in a pre-existing wheel railway track, comprising a magnetic levitation railway track including a linear motor and magnetic levitation rails arranged on outer sides of the wheel railway track, said magnetic levitation rails comprising a conductive guide rail having at least a horizontal portion configured for a magnetic levitation railway vehicle having a levitation device with magnets, the conductive guide rail configured for passive levitation of the magnetic levitation railway vehicle due to the electromotive force generated by the moving magnets of the magnetic levitation railway vehicle, the system further comprising a coupling adaptor for coupling the magnetic levitation railway track to the pre-existing wheel railway track providing a simultaneous operability of the magnetic levitation railway track and the wheel railway track, the coupling adaptor comprising a wheel rail fixation portion configured for mounting to an underside of a conventional rail for wheel railway tracks and further comprising a portion for mounting of the conductive guide rail of the magnetic levitation rail thereon.

2. System according to claim 1 wherein at least one said linear motor is fixed to the wheel railway track along a center line of the wheel railway track.

3. System according to claim 2, wherein the linear motor comprises a synchronous motor vertically upstanding for magnetically coupling to magnets positioned either lateral side of the linear motor.

4. System according to claim 2, wherein the linear motor comprises an asynchronous motor vertically upstanding for coupling to conductive plates positioned either lateral side of the linear motor.

5. System according to claim 1, wherein the magnetic levitation railway track comprises at least one linear motor positioned along and fixed to the magnetic levitation rails.

6. System according to claim 1, wherein the conductive guide rail comprises a vertical portion extending from the horizontal portion for laterally guiding the magnetic levitation railway vehicle.

7. System according to claim 1, further comprising sleepers comprising a substrate embedding a reinforcement and anchor elements upstanding from an upper mounting surface of the sleeper, said anchor elements including anchor elements for a conventional rail and further comprising anchor elements for a magnetic levitation rail at outer ends of the sleeper.

8. System according to claim 7, wherein the conductive guide rail is mounted on a support rail or on a support pillar, the support rail or support pillar being coupled to the sleeper.

9. System according to claim 8, wherein the conductive guide rail is coupled to the support rail including a position adjustment mechanism configured to adjust the vertical height and/or horizontal position of the conductive guide rail.

10. System according to claim 8, wherein the magnetic levitation rail comprises an adaptor-guide interface layer comprising a deformable material for insertion between the conductive guide rail and the support rail or the coupling adaptor.

11. System according to claim 10, wherein the adaptor-guide interface layer comprises a polymer material.

12. System according to claim 1, wherein the coupling adaptor wheel rail fixation portion comprises a receiving profile and a clamping mechanism for clamping to said underside of the conventional rail.

13. System according to claim 1, wherein the wheel railway track comprises wheel rails, the coupling adaptor configured for mounting on or between sleepers of the railway system, the wheel rail fixation portion comprising a receiving profile having a form adapted for mounting to a bottom portion of a said wheel rail, and a clamping mechanism that can be tightened to securely fix the coupling adaptor to the underside of the wheel rail.

14. Coupling adaptor for a railway system comprising a magnetic levitation railway track for integration in a pre-existing wheel railway track, wherein the coupling adaptor is configured for coupling the magnetic levitation railway track to the pre-existing wheel railway track providing a simultaneous operability of the magnetic levitation railway track and the wheel railway track, the magnetic levitation railway track including magnetic levitation rails arranged on outer sides of wheel rails of the wheel railway track, the coupling adaptor configured for mounting on or between sleepers of the railway system and comprising a wheel rail fixation portion comprising a receiving profile having a form adapted for mounting to a bottom portion of a said wheel rail, and a clamping mechanism that can be tightened to securely fix the coupling adaptor to an underside of the wheel rail.

15. Coupling adaptor according to claim 14, wherein the clamping mechanism comprises one or more adjustable clamping hooks.

16. Coupling adaptor according to claim 14, comprising a support pillar for mounting of a guide rail of the magnetic levitation rail, and a position adjustment mechanism to adjust the position of the support pillar to thereby adjust the position of the guide rail with respect to the clamping mechanism.

17. Coupling adaptor according to claim 16, wherein the support pillar comprises an inclined adjustment guide surface to adjust the height of the guide rail with respect to the wheel rail.

18. Coupling adaptor according to claim 17, wherein the inclined adjustment guide surface of the support pillar directly engages an inclined upper mounting surface of the sleeper, or alternatively engages an upper inclined surface of a block mounted fixedly on the sleeper or other structure on which the magnetic levitation rail is mounted.

* * * * *